(12) United States Patent
Oh et al.

(10) Patent No.: US 9,594,268 B2
(45) Date of Patent: Mar. 14, 2017

(54) APPARATUS FOR MANUFACTURING DISPLAY DEVICE AND METHOD FOR MANUFACTURING DISPLAY DEVICE USING THE SAME

(71) Applicant: Samsung Display Co., Ltd., Yongin (KR)

(72) Inventors: Hwa Jin Oh, Seoul (KR); Han Sun Ryou, Hwaseong-si (KR); Dong Jin Seo, Seoul (KR); Moon Hyun Yoo, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 154 days.

(21) Appl. No.: 14/683,084

(22) Filed: Apr. 9, 2015

(65) Prior Publication Data

US 2016/0174423 A1 Jun. 16, 2016

(30) Foreign Application Priority Data

Dec. 10, 2014 (KR) .................. 10-2014-0177314

(51) Int. Cl.
*G02F 1/13* (2006.01)
*C03B 23/02* (2006.01)

(52) U.S. Cl.
CPC ............... *G02F 1/13* (2013.01); *C03B 23/02* (2013.01)

(58) Field of Classification Search
CPC ...... G02F 1/13; H05K 5/0017; H05K 5/0217; B32B 3/04; B32B 3/28; B32B 37/0046; B32B 37/18; B32B 7/12; B32B 38/1866; B32B 2307/412; B32B 2457/208; B32B 2457/20; Y10T 428/24628; Y10T 428/24653; Y10T 156/1002; Y10T 156/1744; Y10T 156/10; H01L 51/56; H01L 51/5237; C03B 23/02
See application file for complete search history.

(56) References Cited

U.S. PATENT DOCUMENTS

| 5,250,146 A | * | 10/1993 | Horvath ............ B32B 17/10825 100/295 |
| 5,494,546 A | * | 2/1996 | Horvath ................ B29C 51/085 100/295 |
| 2005/0250870 A1 | * | 11/2005 | Jallouli .............. B29D 11/0073 522/182 |
| 2006/0273304 A1 | * | 12/2006 | Cok .................... H01L 51/0096 257/40 |
| 2009/0277578 A1 | * | 11/2009 | Sung .................... B32B 37/003 156/285 |

(Continued)

FOREIGN PATENT DOCUMENTS

KR 10-2013-0128407 11/2013
KR 10-2014-0010919 1/2014

*Primary Examiner* — Anne Hines
*Assistant Examiner* — Jose M Diaz
(74) *Attorney, Agent, or Firm* — H.C. Park & Associates, PLC (57) ABSTRACT

Provided is an apparatus for manufacturing a display device and a method for manufacturing the display device. The apparatus for manufacturing a display device comprises a jig having a seating surface that is formed to be bent at least partly and on which a target object is seated, a gasket covering the seating surface at least partly, and a roller pressing the target object.

20 Claims, 9 Drawing Sheets

(56) References Cited

U.S. PATENT DOCUMENTS

| | | | |
|---|---|---|---|
| 2010/0208190 A1* | 8/2010 | Yoshida | G02F 1/1303 349/160 |
| 2011/0146893 A1* | 6/2011 | Marty | B29C 51/08 156/212 |
| 2012/0111479 A1* | 5/2012 | Sung | B32B 17/10174 156/102 |
| 2013/0241128 A1 | 9/2013 | Eda et al. | |
| 2014/0002975 A1 | 1/2014 | Lee et al. | |
| 2014/0345791 A1* | 11/2014 | Son | B32B 37/0046 156/228 |
| 2015/0217925 A1* | 8/2015 | Inagaki | B65D 77/2024 426/106 |

* cited by examiner

APPARATUS FOR MANUFACTURING DISPLAY DEVICE AND METHOD FOR MANUFACTURING DISPLAY DEVICE USING THE SAME

CROSS-REFERENCE TO RELATED APPLICATION

This application claims priority from and the benefit of Korean Patent Application No. 10-2014-0177314, filed on Dec. 10, 2014, which is hereby incorporated by reference for all purposes as if fully set forth herein.

BACKGROUND

Field

Exemplary embodiment relates to an apparatus for manufacturing a display device and a method for manufacturing a display device using the same, and more particularly to an apparatus and a method for manufacturing a display device having a display panel and a cover window attached thereto.

Discussion of the Background

With the development of information society, various display panels, such as an organic light emitting display (OLED) panel, a liquid crystal display (LCD) panel, an EPD panel, and an electrowetting display (EWD) panel, have been applied to display devices.

In a display device having a touch input, such as a smart phone or a tablet PC, and a display device, such as a TV or a monitor as well, a cover window is mounted on one surface of a display panel to protect the display panel. The cover window is laminated on a front surface of the display panel by using transparent adhesives, such as OCA (Optically Clear Adhesive). For example, the cover window is seated on a jig, and then the display panel, to which the transparent adhesives are attached, is compressed and closely adhered to the cover window.

However, since a recently appearing 3D-shaped display device, such as a curved display device, has a cover window that is in a convex or concave shape, it is difficult for the display device to be completely adsorbed onto the jig, and thus bubble formation, detachment, or alignment inferiority may occur.

The above information disclosed in this Background section is only for enhancement of understanding of the background of the inventive concept, and, therefore, it may contain information that does not form the prior art that is already known in this country to a person of ordinary skill in the art.

SUMMARY

Accordingly, one subject to be solved by the present invention is to provide an apparatus for manufacturing a display device, which can increase lamination accuracy between a cover window having a curved surface and a display panel.

Another subject to be solved by the present invention is to provide a method for manufacturing a display device, which can increase lamination accuracy between a cover window having a curved surface and a display panel.

Additional advantages, subjects, and features of the invention will be set forth in part in the description which follows and in part will become apparent to those having ordinary skill in the art upon examination of the following or may be learned from practice of the invention.

In one aspect of the present invention, there is provided an apparatus for manufacturing a display device, comprising a jig having a seating surface that is formed to be bent at least partly and on which a target object is seated, a gasket covering the seating surface at least partly, and a roller pressing the target object.

In another aspect of the present invention, there is provided a method for manufacturing a display device comprising preparing a panel member that includes a cover window having a curved surface and an adhesive layer, arranging the cover window on a seating surface of a jig on which a gasket is installed, forming a negative pressure between the cover window and the seating surface through operation of a suction pump, arranging the panel member including the adhesive layer on the cover window, and pressing the cover window and the panel member on each other by using a roller.

According to embodiments of the present invention, at least the following effects can be achieved.

According to the apparatus for manufacturing a display device according to embodiments of the present invention, the display device having a curved surface can be manufactured promptly and easily.

According to the method for manufacturing a display device according to the present invention, the cover window having a curved surface and the panel member are accurately attached to each other, and thus the inferiority rate of the lamination process can be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
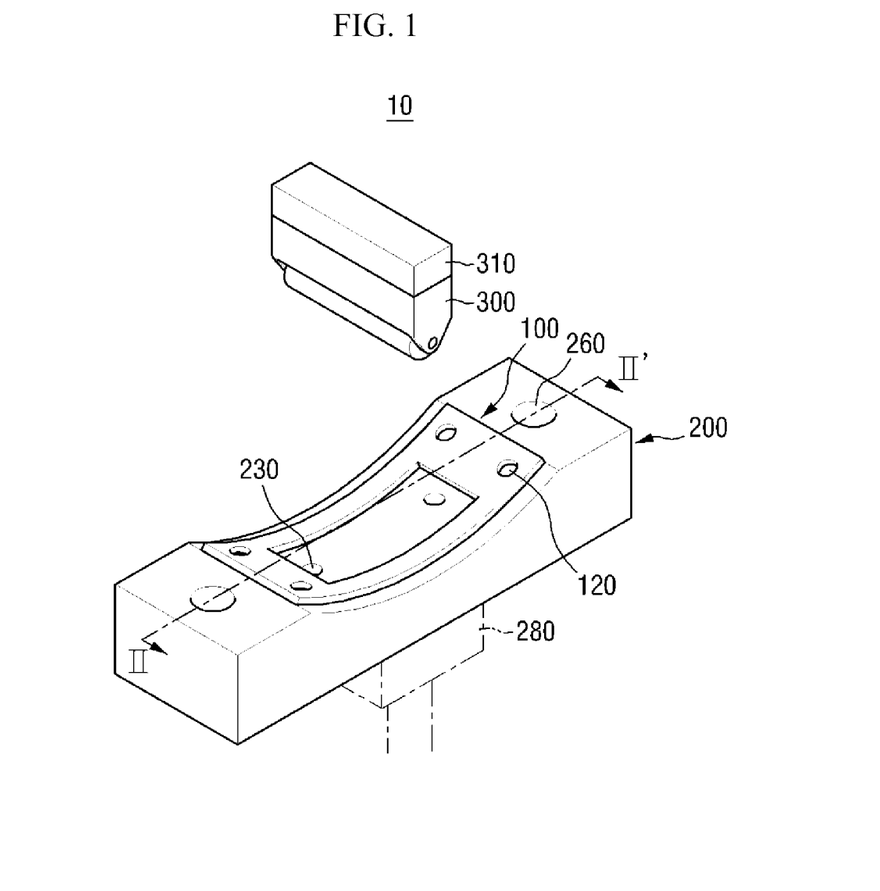
FIG. 1 is a perspective view of an apparatus for manufacturing a display device according to an embodiment of the present invention.
Figure 2:
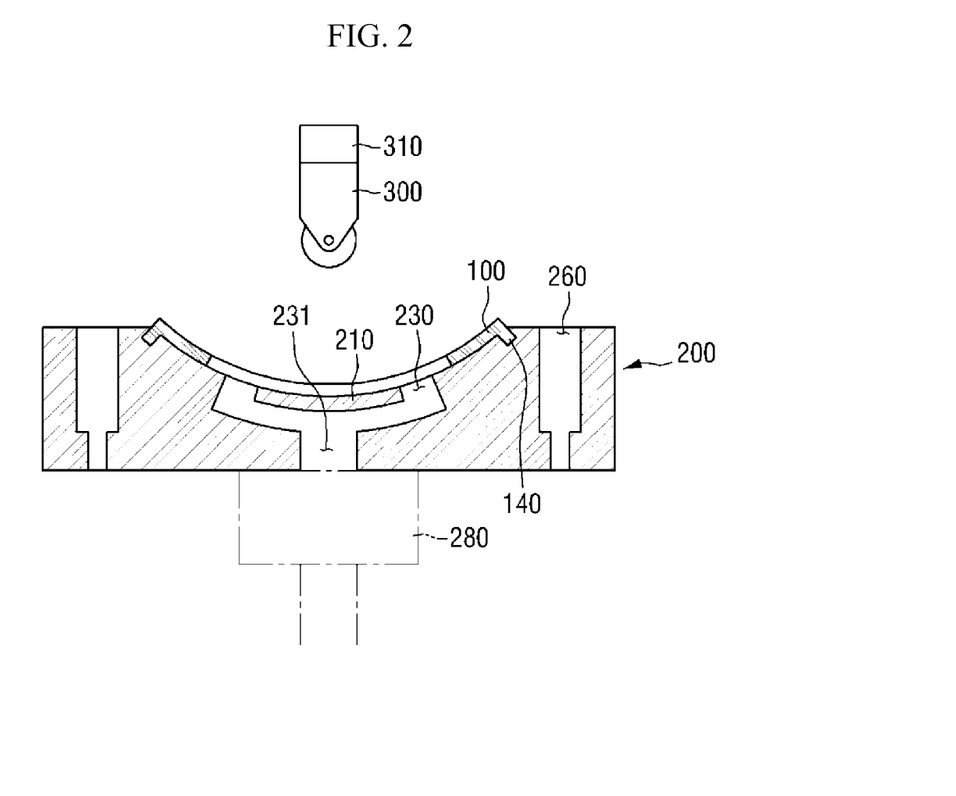
FIG. 2 is a cross-sectional view taken along a line II-II' in FIG. 1 of an apparatus for manufacturing a display device according to an embodiment of the present invention.
Figure 3:
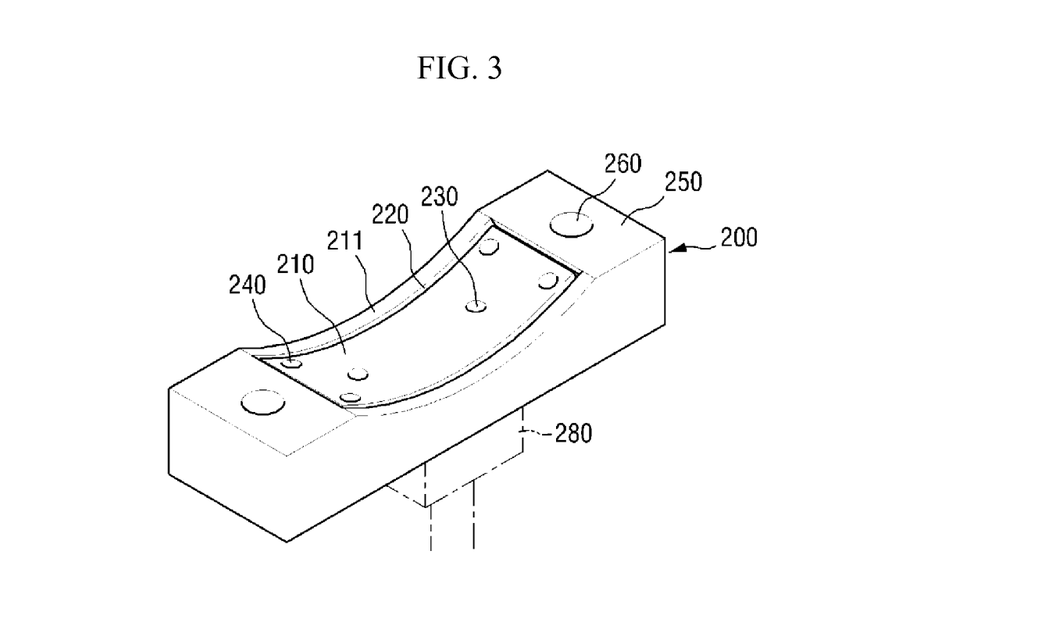
FIG. 3 is a perspective view of a jig according to an embodiment of the present invention.
Figure 4:
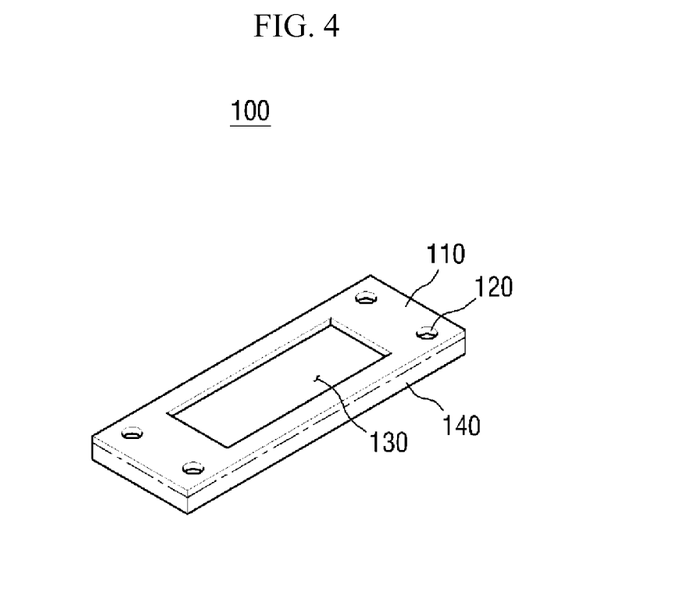
FIG. 4 is a perspective view of a gasket according to an embodiment of the present invention.
Figure 5:
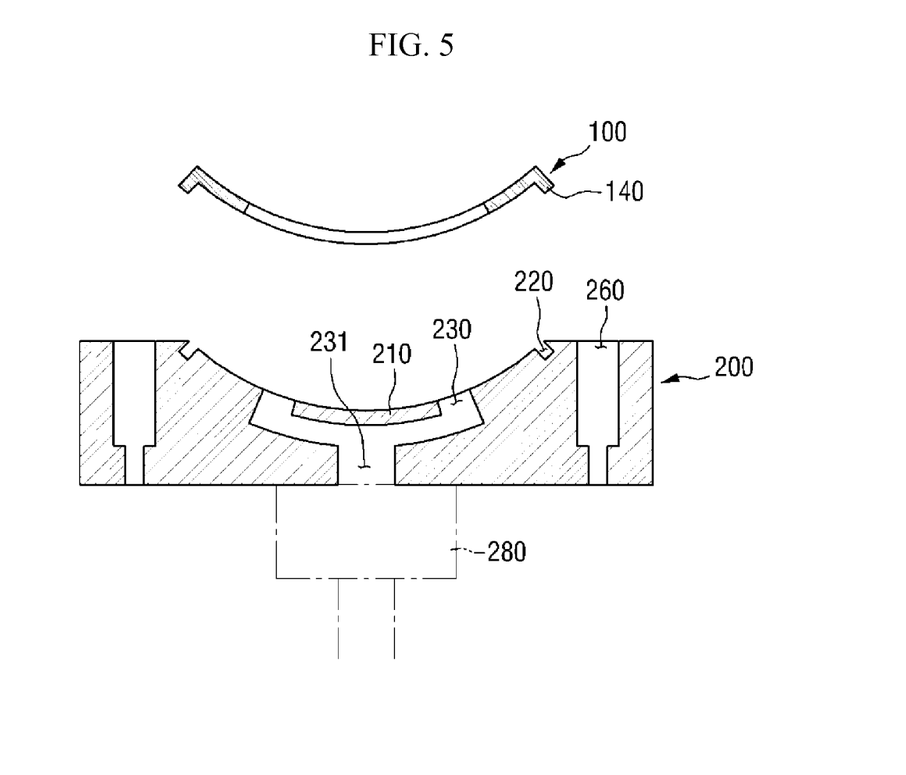
FIG. 5 is a cross-sectional view taken along the line II-II' in FIG. 1 of the jig and the gasket according to an embodiment of the present invention.

FIG. 1 is a perspective view of an apparatus for manufacturing a display device according to an embodiment of the present invention, and FIG. 2 is a cross-sectional view taken along the line II-II' of FIG. 1. FIG. 3 is a perspective view of a jig of FIG. 1, and FIG. 4 is a perspective view of a gasket of FIG. 1. FIG. 5 is a cross-sectional view taken along the line II-II' of FIG. 1 of a jig and a gasket which are separated from each other.

Referring to FIGS. 1 through 5, an apparatus 10 for manufacturing a display device according to an embodiment of the present invention includes a jig 200, a gasket 100 installed on the jig 200, and a roller 300. The roller 300 may be arranged on an upper portion of the jig 200, however it is not limited thereto and a position of the roller 300 may be determined considering a position of a target object to be laminated.

The jig 200 fixes the target object to be laminated. In an embodiment, the target object to be laminated may be an object that is bent at least partly. In an exemplary embodiment, the target object is a cover window that is curved in one direction.

The jig 200 may include a rigid material. For example, the jig 200 may include one material selected from the group including stainless steel, aluminum, and plastic.

Referring to FIG. 3, an upper surface of the jig 200 may include a seating surface 210 and a non-seating surface 250. The target object is seated on an upper portion of the seating surface 210. The seating surface 210 may be positioned in the center portion of the upper surface of the jig 200, and the non-seating surface 250 may be positioned in a periphery portion of the seating surface 210. The seating surface may be arranged in the center portion of the upper surface of the jig 200, and the non-seating surface 250 may be arranged at both ends of the seating surface 210. The seating surface 210 may have a shape that substantially matches the target object. In the case where the target object is a cover window 400 (in FIG. 7) having a concave shape, the seating surface 210 may have a concave shape that substantially matches the shape of the cover window.

The non-seating surface 250 is a portion where the target object is not seated, and thus it is not necessary that the non-seating surface 250 follows the shape of the target object. Accordingly, even if the seating surface 210 has a concave shape, the non-seating surface may have a flat shape. However, the non-seating surface 250 may be formed as a concavely curved surface having substantially the same curvature as the curvature of the seating surface 210.

The non-seating surface 250 may include one or more fixing holes 260. As illustrated in FIG. 2, the fixing holes 260 may be shaped to accommodate fastening members (not illustrated), for example, bolts. The fixing holes 260 may be formed to penetrate the jig 200 in upward/downward direction. Through the fixing holes 260, the fastening members are inserted from an upper side to a lower side or a lower side to an upper side of the jig 200 to fix the jig 200 to another structure (not illustrated) that is arranged on a lower or upper portion of the jig 200.

The jig 200 may include accommodation grooves 220 that are arranged on the seating surface 210. The accommodation grooves 220 serve to accommodate insertion portions 140 of the gasket 100 therein to fix the gasket 100 to the jig 200. The accommodation grooves 220 may be arranged along the periphery portions of the seating surface 210. The accommodation grooves 220 may be formed along the four sides of the seating surface 210, and may be arranged in a rectangular frame shape on plane.

The accommodation grooves 220 may have a shape that coincides with the shape of the insertion portions 140 so as to accommodate the insertion portions 140 of the gasket 100. As illustrated in FIG. 5, the accommodation grooves 220 may be recessed in a vertical direction from the surface of the seating surface 210, or may be recessed in the same direction as the depth direction of the fixing holes 260.

The jig 200 may further include suction ports 230 arranged on the seating surface 210. The suction ports 230 may be connected to a suction pipe 231 that penetrates the jig 200. The other end portion of the suction pipe 231 may be connected to a suction pump 280.

The suction pump 280 serves to suck air. If the suction pump 280 operates, air on the seating surface 210 is discharged to the suction pump 280 through the suction ports 230 and the suction pipe 231, and thus air pressure on the seating surface 210 may be lowered or may be set to a vacuum state or to nearly vacuum state.

Vision holes 240 may be arranged on the seating surface 210 of the jig 200. The vision holes 240 may be formed to penetrate the jig 200 in upward/downward direction in a similar manner to through-holes 260. The vision holes 240 may be arranged to overlap light transmitting portions 120 of the gasket 100 to be described later. In the drawing, it is exemplified that four vision holes 240 are arranged adjacent to four corners of the seating surface 210. However, the number of vision holes 240 and the arrangement thereof are not limited thereto.

The gasket 100 is seated on the seating surface 210 of the jig 200. Referring to FIG. 4, the gasket 100 may include a sealing portion 110, light transmitting portions 120, an opening 130, and insertion portions 140.

The sealing portion 110 of the gasket 100 may have the shape of a rectangular frame, a rectangular ring, or a donut, and define the opening portion 130 therein. The opening 130 is surrounded by the sealing portion 110 to be closed, and exposes the seating surface 210 of the jig 200. The opening 130 may be in a rectangular shape, but is not limited thereto. When the gasket 100 is seated on the jig 200, the step height between an upper surface of the sealing portion 110 of the gasket 100 and the seating surface 210 of the jig 200 may be equal to or higher than 0.5 mm and equal to or lower than 3 mm.

The gasket 100 may include one or more light transmitting portions 120 arranged in the sealing portion 110. The light transmitting portions 120 may vertically penetrate the sealing portion 110 to transmit light. The number of light transmitting portions 120 may be equal to the number of vision holes 240. When the gasket 100 is seated on the jig 200, the light transmitting portions 120 of the gasket 100 are put in portions that overlap the vision holes 240 of the jig 200. Accordingly, even if the gasket 100 is seated on the seating surface 210 of the jig 200, the vision holes 240 are not covered by the sealing portion 110 of the gasket 100, but may be maintained to be open toward an upper side. Through the vision holes 240 and the light transmitting portions 120, misalignment of the cover window that is arranged on the upper portion of the gasket 100 may be tested.

The insertion portions 140 may be formed to extend from the side surface of the gasket 100 to the lower side. Specifically, the insertion portions 140 may be formed on side surfaces of the gasket 100 at least partly, and may extend downwardly from the side surface of the gasket 100. When the gasket 100 is seated on the seating surface 210 of the jig 200, the insertion portions 140 may be accommodated in the accommodation grooves 220 of the jig 200.

The gasket 100 may include a soft material. In an exemplary embodiment, the gasket 100 may include one material selected from the group including silicon, rubber, and flexible synthetic resin.

The gasket 100 improves the degree of close adhesion between the jig 200 and the cover window 400. Accordingly, the gasket 100 may intercept air circulation between an external space and a confined space that is surrounded by the jig 200, the gasket 100, and the cover window 400, and thus negative pressure can be easily formed and maintained in the confined space. The gasket 100 made of a soft material can further improve the close adhesion thereof, and it becomes much easier to maintain the negative pressure in the confined space. As a result, the cover window 400 (FIG. 7) and the panel member 500 (FIG. 8) can be accurately attached to each other, and thus the occurrence of bubble formation, detachment, or alignment inferiority can be suppressed in the lamination process.

Referring again to FIG. 1, the roller may be arranged on the upper portion of the jig 200, however it is not limited thereto. The roller 300 is connected to a driving portion 310, and the driving portion 310 provides power for moving the roller 300 in vertical and horizontal directions. Specifically, in performing the lamination process, the driving portion 310 may make the roller 300 descend in the vertical direction so that the roller 300 is adjacently arranged onto the seating surface 210 of the jig 200, and then make the roller 300 move in the horizontal direction.

The driving portion 310 may include, for example, a cylinder that is driven by air pressure or hydraulic pressure to move the roller 300. Further, the driving portion 310 may include a motor that is driven by electrical energy to move the roller 300. In particular, the driving portion 310 is not limited to that as exemplified above, but may include all devices that can provide power.

The roller 300 has a rotatable shape. For example, the roller 300 may be in a cylindrical shape. The width of the roller 300 that corresponds to the height of the cylindrical shape may be equal to or smaller than the width of the panel member 500. If the width of the roller 300 is equal to the width of the panel member 500, it becomes possible to press the whole area of the panel member 500 through one movement of the roller 300, while if the width of the roller 300 is smaller than the width of the panel member 500, it becomes possible to press the whole area of the panel member 500 through movement of the roller 300 twice or more.

The radius of the circular cross-section of the roller 300 may be equal to the radius of curvature of the cover window 400, but is not limited thereto. Even if the radius of the circular cross-section of the roller 300 is smaller than the radius of curvature of the cover window 400, it is possible to perform the pressing process through rotation of the roller 300.

Hereinafter, an exemplary method for manufacturing a display device using the apparatus 10 for manufacturing a display device as described above will be described.

Figure 6:
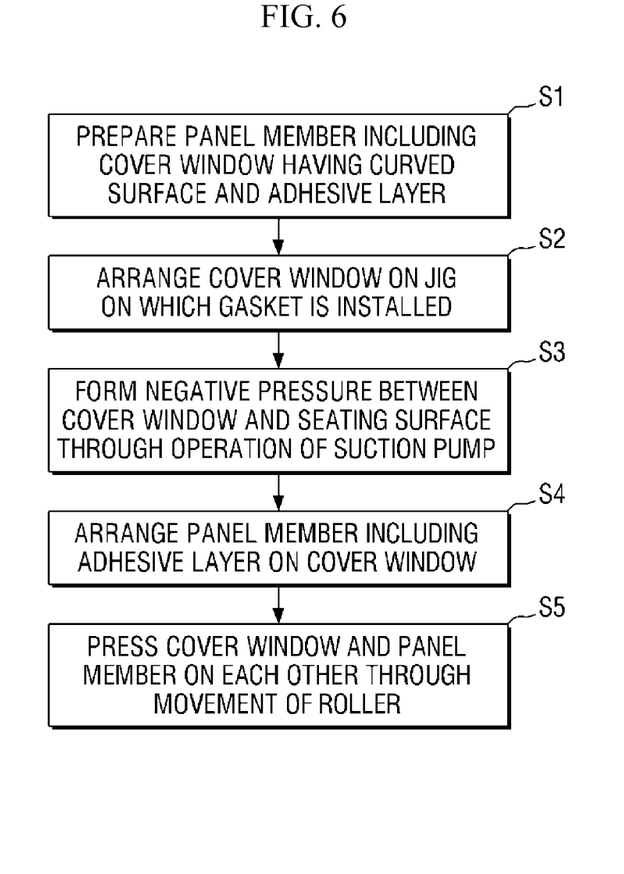
FIG. 6 is a flowchart illustrating a method for manufacturing a display device according to an embodiment of the present invention.

FIG. 6 is a flowchart illustrating a method for manufacturing a display device according to an embodiment of the present invention. FIGS. 7 through 9, 11, and 13 are perspective views explaining processing steps of a method for manufacturing a display device according to an embodiment of the present invention, and FIGS. 12 and 14 are cross-sectional views of FIGS. 11 and 13, respectively.

Figure 7:
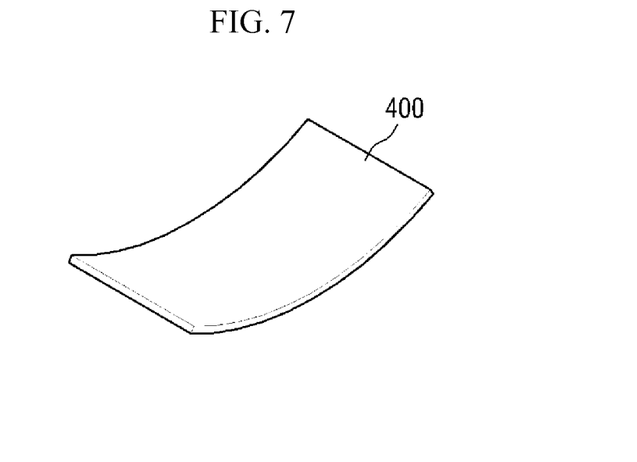
FIGS. 7 through 14 are perspective views and cross-sectional views explaining processing steps of a method for manufacturing a display device according to an embodiment of the present invention.
Figure 8:
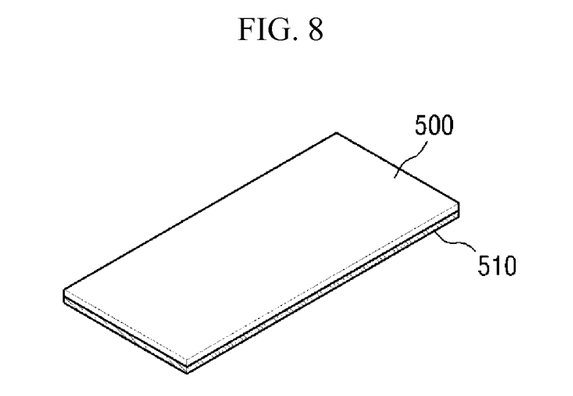

First, referring to FIGS. 6, 7, and 8, a panel member 500 with an adhesive layer 510 and a cover window 400 having a curved surface are prepared (S1).

The cover window 400 may have a concave or convex shape. Hereinafter, for convenience in explanation, detailed explanation will be made around a case where the cover window 400 is concave.

As illustrated in FIG. 7, the cover window 400 may be bent. In contrast, as illustrated in FIG. 8, the panel member 500 may have a flat shape and may be made of a flexible material. The panel member 500 may include one of a display panel and a touch panel. The size of the panel member 500 may be different from the size of the cover window 400. More specifically, the panel member 500 may have a size that is equal to the size of the cover window 400, or may be smaller than the cover window 400.

The cover window 400 may include various kinds of materials. In an exemplary embodiment, the cover window 400 may be made of a glass material or a plastic material, but is not limited thereto. The cover window 400 may include all materials that can be bent at least partly.

An adhesive layer 510 is formed on one surface of the panel member 500. The adhesive layer 510 may be a transparent adhesive layer. For example, the adhesive layer 510 may be made of OCA (Optically Clear Adhesive), but is not limited thereto. The adhesive layer 510 may be made of OCR (Optically Clear Resin).

Figure 9:
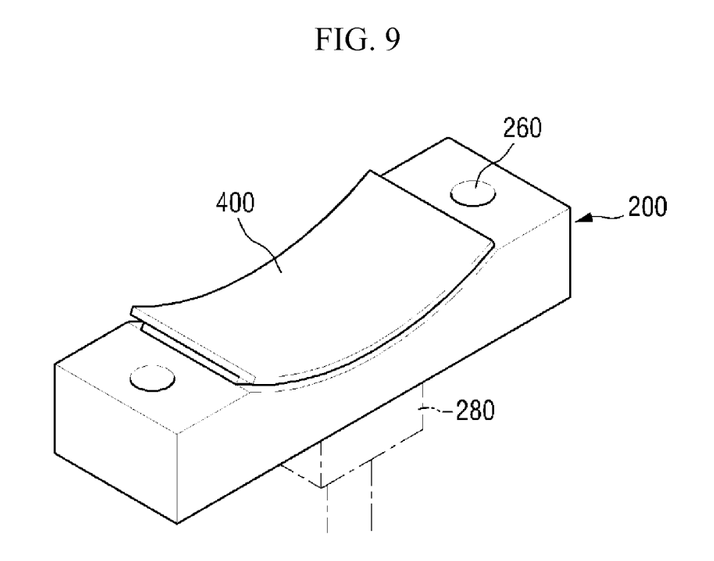
Figure 10:
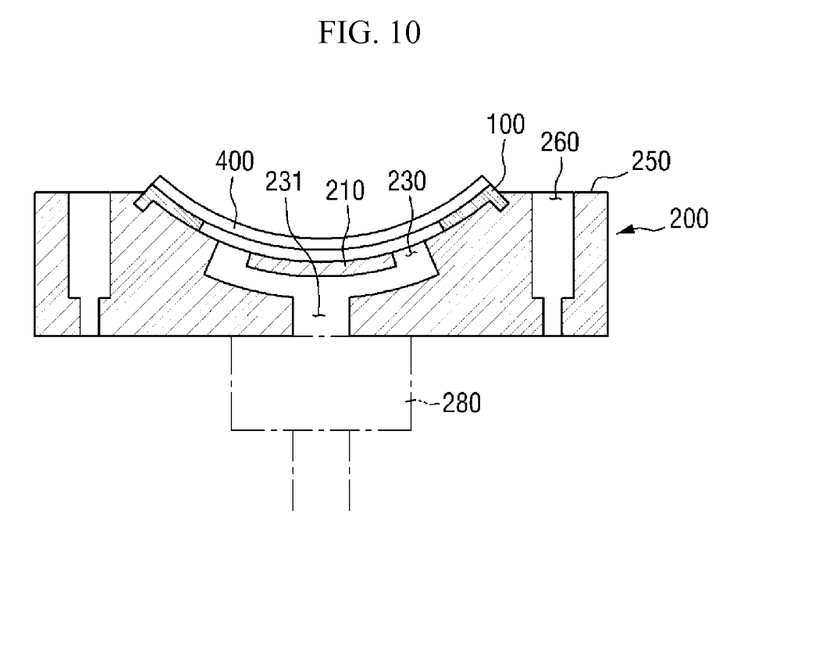

Referring to FIGS. 6, 9, and 10, the cover window 400 is arranged on a jig 200 on which a gasket 100 is installed (S2).

Specifically, the cover window 400 is arranged on a seating surface 210 of the jig 200 so that the gasket 100 and the cover window 400 come in contact with each other. The seating surface 210 of the jig 200 may be formed to be bent, and thus one surface of the cover window 400 is able to come in completely close contact with the gasket 100. In this case, due to the gasket 100 that is put between the seating surface 210 of the jig 200 and the cover window 400, the seating surface 210 of the jig 200 and the cover window do not in direct contact with each other, but may be spaced apart from each other for the thickness of the gasket 100. As described above, since the gasket 100 includes a soft material, the degree of close adhesion between the jig 200 and the cover window 400 can be improved. Further, since the gasket 100 intercepts air circulation between an external space and the confined space that is surrounded by the jig 200, the gasket 100, and the cover window 400, a negative pressure can be easily formed and maintained in the confined space. As a result, the cover window 400 and the panel member 500 can be accurately attached to each other, and thus the occurrence of bubble formation, detachment, or alignment inferiority can be suppressed in the lamination process.

The confined space that is surrounded by the jig 200, the gasket 100, and the cover window 400 may be connected to a suction port 230 of the jig 200.

Next, a negative pressure is formed between the cover window 400 and the seating surface 210 through an operation of a suction pump 280 (S3).

Specifically, if the suction pump 280 operates after the cover window 400 is arranged, air on the seating surface 210 is discharged to the side of the suction pump 280 through suction ports 230 and a suction pipe 231, and thus air pressure on the seating surface 210 may be lowered or may be set to a vacuum state or to nearly vacuum state. As the pressure in the suction port 230 is lowered, the pressure in the confined space that is put between the seating surface 210 of the jig 200 and the cover window 400 is also lowered, and thus the outside of the confined space is in a relatively high pressure state. More specifically, the upper side of the cover window 400 has relatively high pressure in comparison to the lower side of the cover window 400. In this case, the cover window 400 receives a pulling force in the direction of the lower side having relatively low pressure, and due to this force, the cover window 400 can be stably adsorbed onto the seating surface 210 of the jig 200.

When the suction pump 280 operates as described above, the cover window 400 can be stably adsorbed onto the seating surface 210 of the jig 200 without seceding from the jig 200 on which the gasket 100 is seated. Accordingly, the display device having a curved surface can be manufactured promptly and easily, reducing the chance of bubble formation, detachment, or alignment problems.

Figure 11:
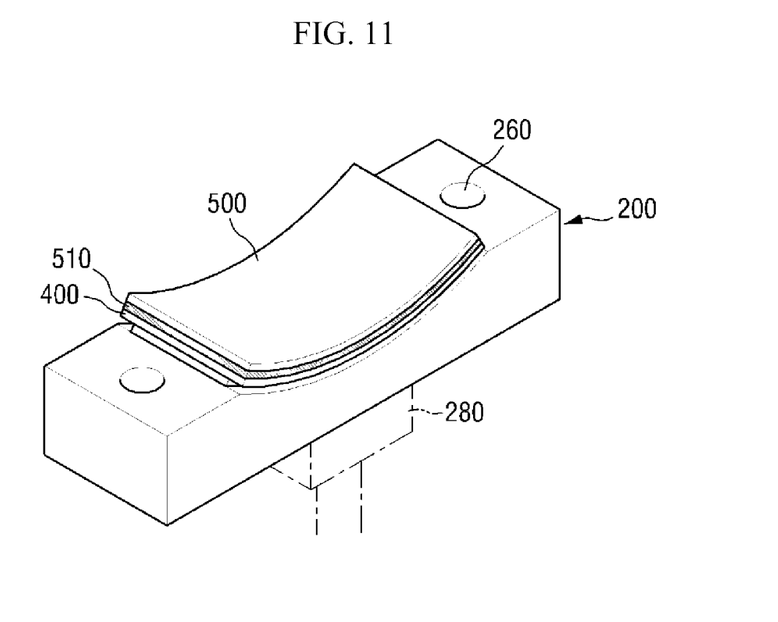
Figure 12:
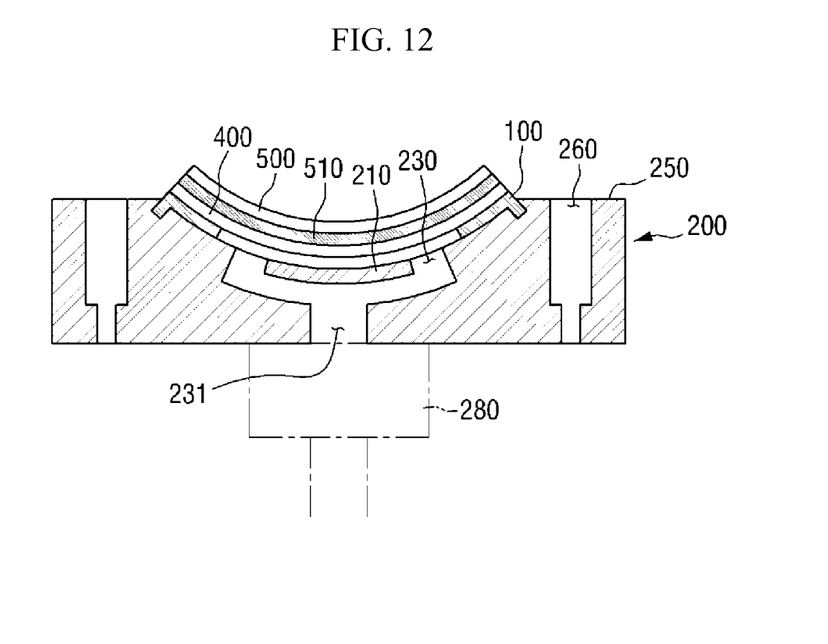

Referring to FIGS. 6, 11, and 12, the panel member 500 that includes the adhesive layer 510 is arranged on the cover window 400 (S4).

The adhesive layer 510 that is seated on one surface of the panel member 500 may be formed in a film shape to be attached to the panel member 500, or may be formed in a material shape to be transferred to or coated on the panel member 500. However, for convenience of explanation, the following explanation is about a case where the adhesive layer 510 is formed in a film shape. In an exemplary embodiment, the adhesive layer 510 may not be seated on one surface of the panel member 500, but may be seated on one surface of the cover window 400. More specifically, the adhesive layer 510 may also be seated on one surface of the cover window 400 that faces one surface of the panel member 500.

When the panel member 500 that is made of a flexible material is arranged on the cover window 400 having a curved surface, it may be bent to coincide with the curved surface of the cover window 400.

Figure 13:
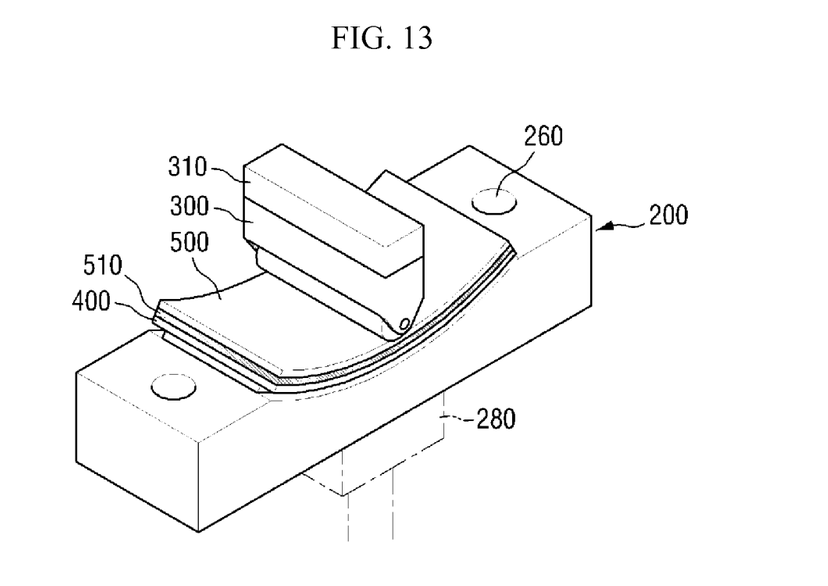
Figure 14:
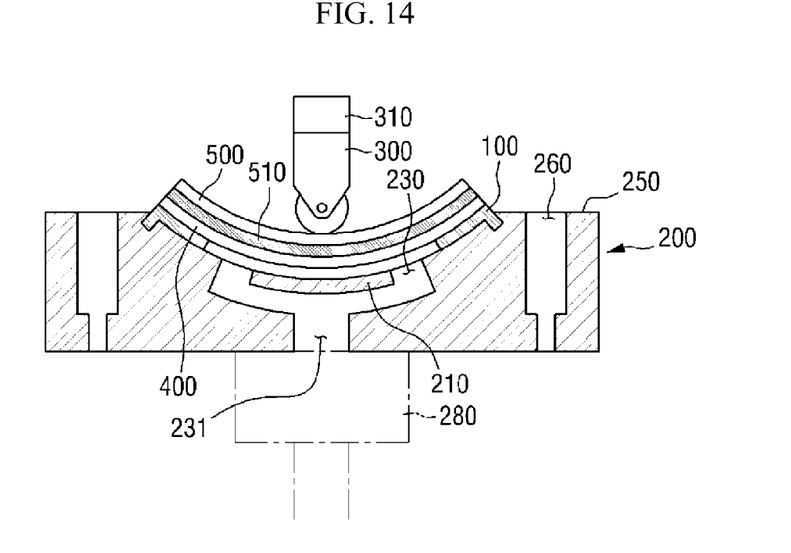

Referring to FIGS. 6, 13, and 14, the cover window 400 and the panel member 500 are pressed on each other through movement of the roller 300 (S5).

The driving portion 310 may be driven to move the roller 300 to the jig 200. When the driving portion 310 operates, the roller 300 may become adjacent to the panel member 500. If the roller 300 continuously moves to the jig 200, the roller 300 may come in contact with the panel member 500.

If the driving portion 310 continuously operates after the roller 300 comes in contact with the panel member 500, the roller 300 is rotated to move on the panel member 500. The roller 300 may move once or may move twice or more on the panel member 500. In this case, the adhesive layer 510 may come in contact with the cover window 400, and the panel member 500 and the cover window 400 may be pressed on each other.

In an exemplary embodiment, when the cover window 400 and the panel member 500 are adhered to each other as described above, the load range in which the jig 200 and the roller 300 presses on the cover window 400 and the panel member 500 may be equal to or higher than 0.3 Mpa and equal to or lower than 0.5 Mpa. In this case, if the load range is lower than 0.3 Mpa, the adsorption force between the cover window 400 and the panel member 500 may deteriorate, and thus the cover window 400 and the panel member 500 may be separated from each other after lamination. Further, if the load range exceeds 0.5 Mpa, the cover window 400 or the panel member 500 may be damaged when the cover window 400 and the panel member 500 are adsorbed to each other, and this may cause quality inferiority or may decrease reliability.

Hereinafter, an apparatus for manufacturing a display device according to other embodiments of the present invention will be described.

Figure 15:
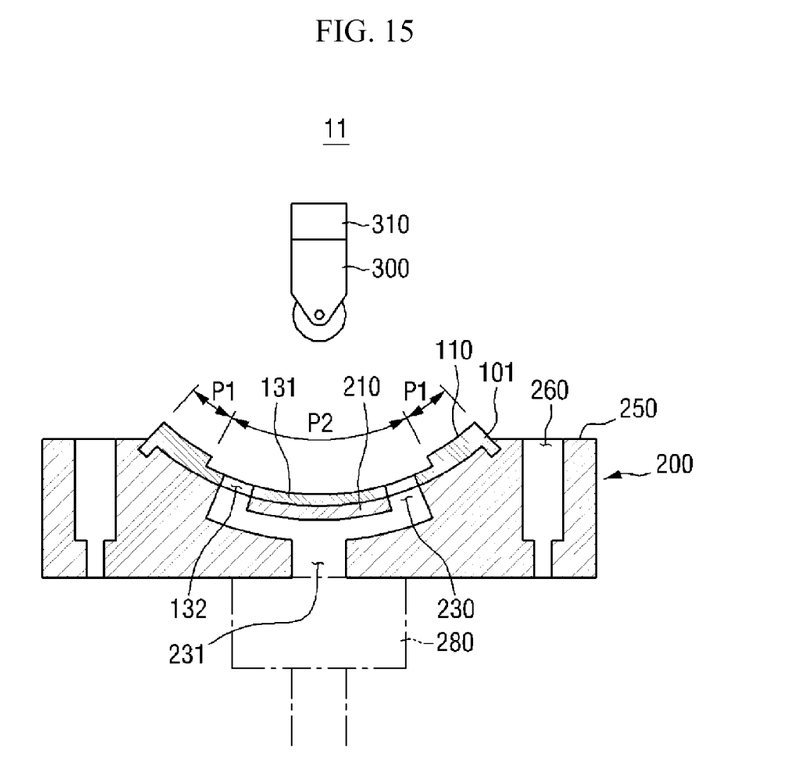
FIG. 15 is a cross-sectional view of an apparatus for manufacturing a display device according to another embodiment of the present invention.

FIG. 15 is a cross-sectional view of an apparatus 11 for manufacturing a display device according to another embodiment of the present invention.

Referring to FIG. 15, the apparatus 11 for manufacturing a display device according to another embodiment of the present invention is different from the apparatus 10 of FIGS. 1 through 5 because a gasket 101 has different thicknesses by areas.

As illustrated, a second area P2 that is thinner than a first area P1 may be positioned in the center portion of the gasket 101, and the first area P1 that is thicker than the second area P2 may be positioned around the second area P2. The sealing portion 110 that is formed on the first area P1 may be relatively thicker than the bottom portion 131 that is formed on the second area P2.

More specifically, a step height may be formed between an upper surface of the sealing portion 110 and an upper surface of the bottom portion 131, and the upper surface of the bottom portion 131 may be formed to be lower than the upper surface of the sealing portion 110. In this case, if a cover window 400 (in FIG. 7) is arranged on the sealing portion 110 that is formed on the first area P1, the bottom portion 131 that is formed on the second area P2 may be separated from the cover window 400, and a space for forming a negative pressure may be formed between the bottom portion 131 and the cover window 400.

Accordingly, the gasket 101 with the bottom portion 131 can increase the space for forming the negative pressure compared to the gasket 100 illustrated in FIGS. 1 through 5.

On the other hand, the gasket 101 may include one or more vent portions 132 formed on the bottom portion 131.

The vent portion 132 may be connected to a pipe that vertically penetrates the gasket 101 to pass air. The vent portions 132 may be positioned in areas that overlap suction ports 230 of the jig 200, and the number of vent portions 132 may coincide with the number of suction ports 230. As illustrated, the gasket 101 may include two vent portions 132, and the vent portion 132 may have a circular cross-section.

Figure 16:
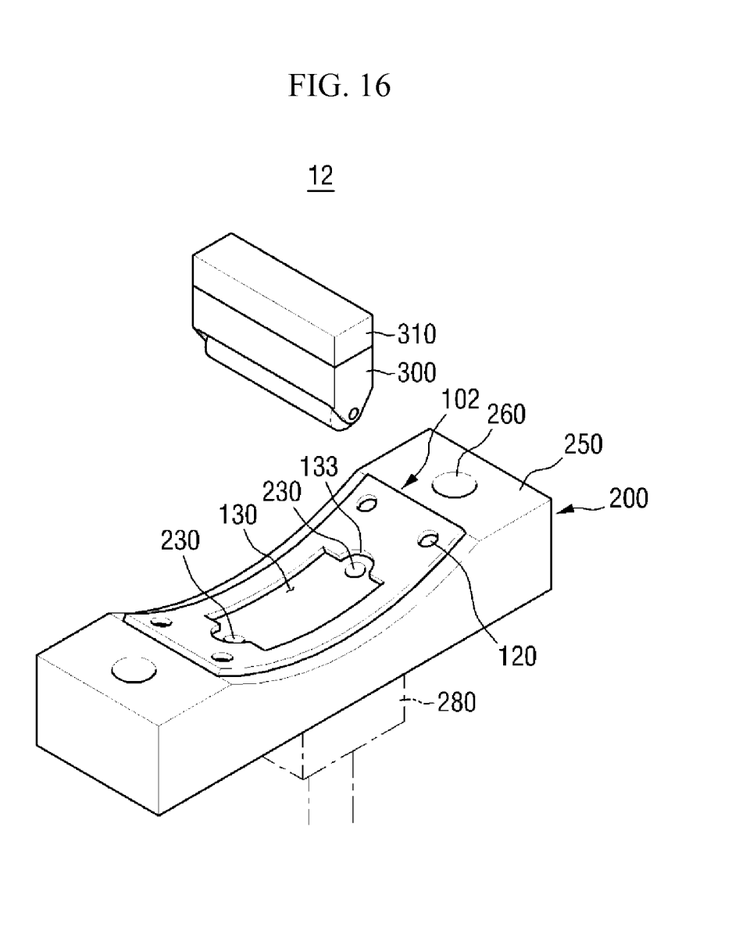
FIG. 16 is a perspective view of an apparatus for manufacturing a display device according to still another embodiment of the present invention.

FIG. 16 is a perspective view of an apparatus 12 for manufacturing a display device according to still another embodiment of the present invention.

Referring to FIG. 16, the apparatus 12 for manufacturing a display device according to this embodiment is different from the apparatus 10 of FIGS. 1 through 5 on the point that a gasket 102 includes round portions 133.

Specifically, as illustrated, the gasket 102 of the apparatus 12 for manufacturing a display device according to this embodiment may include round portions 133 of a circular shape that surround suction ports 230.

Since the gasket 102 is provided with the round portions 133, the surface, on which the cover window 400 (in FIG. 7) is seated, has a wide area in comparison to the gasket 100 illustrated in FIGS. 1 to 5, and thus adsorption can be maintained stably even though the suction ports 230 are arranged to be spaced apart from each other for a long distance.

As described above, according to the method for manufacturing a display device according to the present invention, the display device having a curved surface can be manufactured promptly and easily. In particular, according to the method for manufacturing a display device according to the present invention, the lamination accuracy between the cover window having a curved surface and the display panel can be increased.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus for manufacturing a display device, comprising:
    a jig having a seating surface;
    a gasket covering the seating surface at least partly; and
    a roller,
    wherein the jig has a curved portion.

2. The apparatus of claim 1, wherein the seating surface has a concave or convex shape.

3. The apparatus of claim 1, wherein the jig comprises accommodation grooves formed on the seating surface that accommodates a part of the gasket.

4. The apparatus of claim 1, wherein the gasket comprises one material selected from the group including silicon, rubber, and flexible synthetic resin.

5. The apparatus of claim 1, wherein the gasket comprises:
    a sealing portion with an opening,
    wherein the opening exposes the seating surface.

6. The apparatus of claim 5, wherein a step height between an upper surface of the sealing portion and the seating surface ranges from 0.5 mm to 3 mm.

7. The apparatus of claim 5, further comprising:
    a suction pump,
    wherein the jig includes suction ports formed in the seating surface, and the suction ports are connected to the suction pump.

8. The apparatus of claim 7, wherein the suction ports are arranged on areas that overlap the opening.

9. The apparatus of claim 1, wherein the gasket comprises:
   a sealing portion; and
   a bottom portion,
   wherein the bottom portion is thinner than the sealing portion.

10. The apparatus of claim 1, wherein the gasket comprises round portions.

11. A method for manufacturing a display device, comprising:
   preparing a panel member that includes a cover window having a curved surface and an adhesive layer;
   arranging the cover window on a seating surface of a jig on which a gasket is installed;
   forming a negative pressure between the cover window and the seating surface;
   arranging the panel member including the adhesive layer on the cover window; and
   pressing the cover window and the panel member on each other by a roller.

12. The method of claim 11, wherein the jig comprises accommodation grooves formed on the seating surface that accommodates a part of the gasket.

13. The method of claim 11, wherein the gasket comprises one material selected from the group including silicon, rubber, and flexible synthetic resin.

14. The method of claim 11, wherein the gasket comprises:
   a sealing portion with an opening, and
   wherein the opening exposes the seating surface.

15. The method of claim 11, wherein the cover window comprises one of a glass material and a plastic material.

16. The method of claim 11, wherein a pressure the roller applies between the cover window and the panel member ranges from 0.3 Mpa to 0.5 Mpa.

17. The method of claim 11, wherein a shape of the seating surface substantially matches the cover window.

18. The method of claim 11, wherein a size of the panel member is different from a size of the cover window.

19. The method of claim 11, wherein the panel member comprises one of a display panel and a touch panel.

20. The method of claim 11, wherein the panel member is flexible.

* * * * *